United States Patent [19]

Plass

[11] 4,233,024
[45] Nov. 11, 1980

[54] APPARATUS FOR DESTRUCTIVE DISTILLATION OF CELLULOSIC MATERIALS

[76] Inventor: Vernon F. Plass, 6320 Coteswood, Memphis, Tenn. 38134

[21] Appl. No.: 961,925

[22] Filed: Nov. 20, 1978

[51] Int. Cl.³ .............................. F23J 5/00; F23J 7/00
[52] U.S. Cl. .................................... 432/72; 110/243; 122/5.5 A; 432/58
[58] Field of Search ................. 122/5, 5.5 R; 110/102, 110/224, 243, 244, 248, 342, 346; 201/27; 48/101, 111; 432/58, 72

[56] References Cited
U.S. PATENT DOCUMENTS

| | | | |
|---|---|---|---|
| 1,948,173 | 2/1934 | Hagan | 432/58 |
| 3,823,677 | 7/1974 | Polsak | 110/246 |
| 3,863,359 | 2/1975 | Grega | 432/58 |
| 3,977,947 | 8/1976 | Pyle | 432/58 |
| 4,030,895 | 6/1977 | Caughey | 110/224 |
| 4,095,958 | 6/1978 | Caughey | 48/111 |

Primary Examiner—John J. Camby
Attorney, Agent, or Firm—Clarence A. O'Brien; Harvey B. Jacobson

[57] ABSTRACT

An apparatus is disclosed for generating combustible gas from cellulosic fiber material. A gas production chamber contains an inclined support chute having a grate perforated with alternately angled ports for admission of a controlled amount of air through the grate portion for performing first a lifting function and then a propelling function on cellulosic material entering at the top and undergoing progressive destructive to form combustible gases in the chamber. The chamber atmosphere has an oxygen content insufficient for complete combustion. The combustible gases are withdrawn, additional secondary air is blended in the gas, and complete combustion of the blend is effected in a combustion chamber. The heated gases formed are then forced by a recirculation blower to a point of use, such as the interior atmosphere of a lumber drying kiln.

13 Claims, 9 Drawing Figures

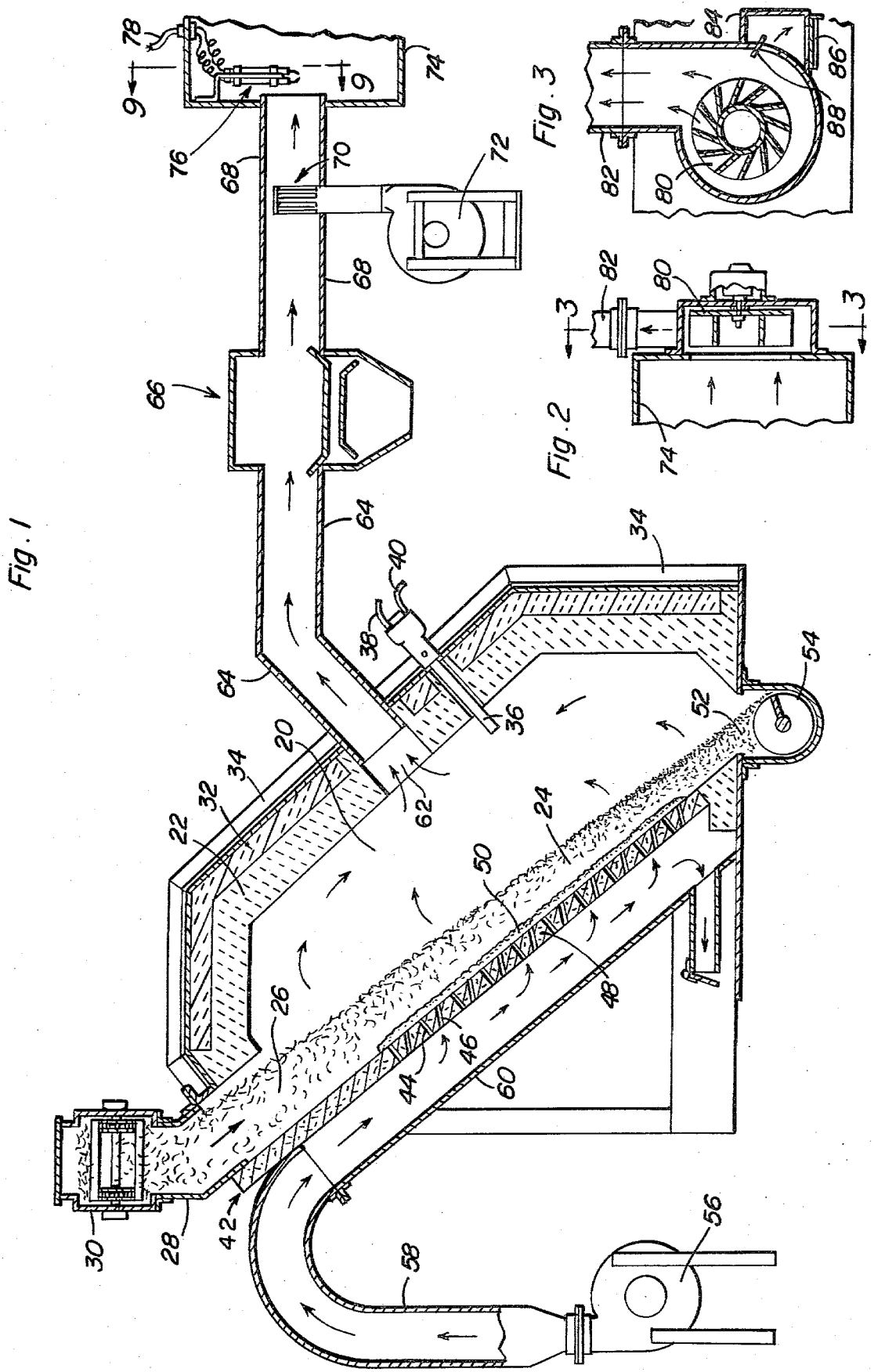

APPARATUS FOR DESTRUCTIVE DISTILLATION OF CELLULOSIC MATERIALS

BACKGROUND OF THE INVENTION

It is well known that an imbalance in current rates of energy production and consumption could lead to an impending national energy crisis of severe proportions, bringing about serious shortages and higher prices of fuels, including those conventionally used for heating lumber dry kilns. A readily available supply of wood fiber material of low commercial value has forced lumber producers to seek a satisfactory manner of utilizing normally wasted wood fiber as a means of producing heat for the drying of green lumber. Methods now available require at economically prohibitive expense preparation of the wood fiber prior to burning, where expensive equipment of high capital construction cost, particularly the high horsepower electrical motors necessary, offsetting much of the savings possible from use of waste wood fiber as a fuel for heating lumber dry kilns. Moreover, methods now available produce residue deposit on lumber, such deposits presenting quality control problems, as well as unpleasant and unhealthful conditions for personnel charged with final machining of kiln dried lumber. Such methods also produce a pollution hazard with respect to atmospheric emission of pollutants. In addition, known methods present mechanical problems which produce prohibitive maintenance expense and loss of production time.

Previous examples of equipment for destroying cellulosic materials are known, including U.S. Pat. No. 3,886,873, issued June 3, 1975 to Sundqvist et al showing a method of destroying waste by gasification and subsequent combustion of the gaseous products, but using a rotary grate with a separate fan for introduction of combustion air. U.S. Pat. No. 2,165,802, issued July 11, 1939 to Longtin, discloses a sawdust burning furnace with a horizontal grate having parallel slots, and the Doherty patent (U.S. Pat. No. 1,154,910), patented Sept. 28, 1915, shows a furnace with an inclined grate on which kindling is ignited, but the grate so described fails to withstand the temperatures and abrasion which results from normal use. U.S. Pat. No. 3,831,535 issued Aug. 27, 1974 to Baardson discloses a burner system in which waste wood is burned as a source of heat while reducing the volume of pollutant fumes. However, it is necessary in the Baardson system to grind up raw waste wood to a fine powdery form for introduction into a combustion chamber. Caughey in U.S. Pat. No. 4,030,895, issued June 21, 1977, shows apparatus for generating combustible fuel gases having an inclined grate dividing the chamber into two parts.

Other patents showing generally the carbonizing, gasification, destruction, or firing of various cellulosic materials include the following:

| | | |
|---|---|---|
| 3,398,058 | Campbell | Aug. 20, 1968 |
| 3,865,053 | Kolze | Feb. 11, 1975 |
| 3,746,521 | Giddings | July 17, 1973 |
| 3,729,298 | Anderson | April 24, 1973 |
| 2,086,033 | Huttner | July 6, 1937 |
| 2,071,678 | Bellay | Feb. 23, 1937 |
| 1,917,196 | Perry | July 4, 1933 |
| 353,966 | Rathbun | Dec. 7, 1886 |

A drawback associated with each of the patents listed above is their failure to teach a grating or support material which is durable in extended use. Refractory materials have been manufactured from a variety of components, including metals in particulate form. U.S. Pat. No. 2,881,083, patented Apr. 7, 1959 by Veale discloses addition of iron powder to a kaolin-type clay, in order to produce a refractory brick composition. U.S. Pat. No. 3,382,082 to Eubanks et al, patented May 7, 1968, teaches introduction of a metal powder into a ceramic refractory composition, and U.S. Pat. No. 220,715, issued Oct. 21, 1879 to Kinklein, discloses addition of iron filings to clay to produce a fire clay which makes tight stove joints. Disclosure of incorporation of aluminum metal in refractory composition can be found in U.S. Pat. No. 3,649,315, issued Mar. 14, 1972 to Booth, and in U.S. Pat. No. 2,613,153, patented Oct. 7, 1952 by Stafford, with the latter patent mentioning kaolin specifically.

SUMMARY OF THE INVENTION

In order to provide a practical, workable gas generator for producing combustible gases from wood fiber material of low commercial value, a refractory gas production chamber is furnished with a continuous support channel extending from its top to bottom for conveyance of incoming cellulosic material. The support channel has a continuous grate on its lower surface, beneath which a parallel air box conveys a controlled flow of air through the grate for supporting partial combustion of wood fiber, for propelling the wood fiber material downwardly along the grate, and for raising the cellulosic material off the surface of the grate and performing a preheating function. The invention contemplates withdrawal of the combustible gases produced in the refractory gas production chamber, introduction of secondary air into the stream of combustible gas, ignition of the blended mixture in a combustion chamber for complete combustion thereof, purging of particulate matter, and use of the heated gas so produced, such as for kiln drying of lumber.

Also contemplatd for use in the gas production chamber, is a grate constructed from a kaolin-based material interlaced with needles of metal, particularly stainless steel.

Accordingly, it is an object of the present invention to provide an apparatus for generating combustible gas from cellulosic material, blending the secondary source of air with the gas so generated, igniting the mixture and removing particulate material in the combustion products for conveying to a point of use, such as a lumber drying kiln.

Another object of the invention is to provide such an apparatus with a refractory gas production chamber having a support chute for introducing cellulosic material, the chute having a grate of a composition which is durable during the intended use.

A further object of the invention is to provide a grate having alternately angled ports for introduction of a controlled amount of air for progressive destruction of the cellulosic material, for raising the incoming material from the surface of the grate and performing a preheating function, and for progressively propelling the cellulosic material downwardly as it undergoes progressive decomposition.

Still another object of the invention is to provide apparatus for using the combustion products of wood fiber material of low commercial value for kiln drying of lumber without residue deposition on the dried lumber.

Yet another object of the invention is to avoid the expense of the preparation of wood fiber to be burned.

A further object of the invention is to reduce hazards associated with prior burning equipment, such as air pollution hazards associated with burning of cellulosic fibers in prior art devices.

Yet a further object is to provide a gas production chamber which runs at a temperature approximately 600 degrees F. lower than in existing devices, and thereby avoid or minimize slagging problems.

A still further object is to avoid placing shelf areas in the gas production chamber which could hinder the free flow of cellulosic material, such as wood chips.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a longitudinal sectional view of an arrangement of the present invention, showing blowers for introduction of primary air and secondary air, a refractory gas production chamber, a low velocity air canister, and a combustion chamber for the final stage of completion combustion.

FIG. 2 is a continuation of the combustion chamber of FIG. 1, showing a recirculation blower in association therewith.

FIG. 3 is a sectional view of the recirculation blower of FIG. 2, taken substantially upon a plane passing along section line 3—3 on FIG. 2, showing in addition a low velocity air box attached to the blower.

DESCRIPTION OF THE PREFERRED EMBODIMENT

Figure 4:
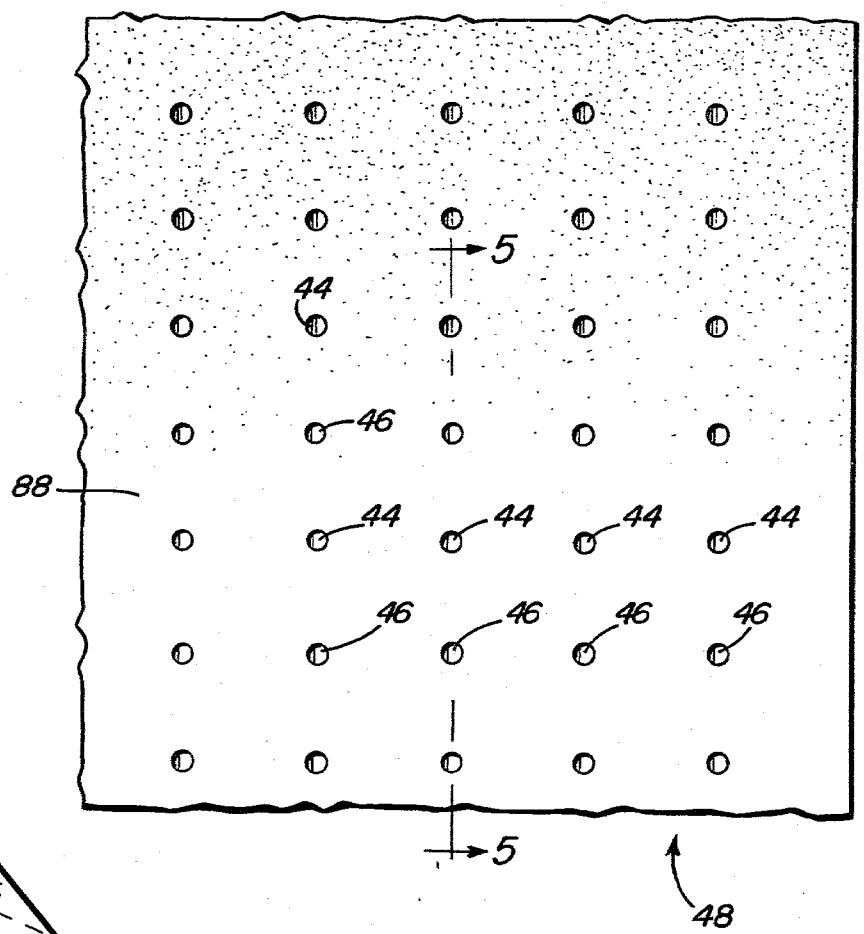
FIG. 4 is a top plan view of the grate portion of the support chute in the refractory gas production chamber, taken in a direction perpendicular to the plane of the support chute.

The inventive apparatus shown in FIG. 1 is made up of gas production chamber 20, having refractory lining 22 for containing combustion gases in chamber 20 generated from partially decomposed cellulosic material 24. Incoming cellulosic material 26 is introduced through hopper 28 and conveyor 30, which are designed to prevent substantial leakage of combustion gas from gas production chamber 20. Insulating layer 32 is supported by frame 34, which is conventional structural angle iron. Flame igniter 36 is provided as a pilot light to insure the limited combustion inside chamber 20 of the products of decomposition of cellulosic material 24 with the limited supply of air in chamber 20. Products of incomplete combustion, such as carbon monoxide, result from substances evolved from decomposing cellulosic material 24. Controlled amounts of gas and air are introduced through inlet lines 38 and 40 of flame igniter 36 to permit a permanent ignition flame to be present within gas production chamber 20.

Figure 5:
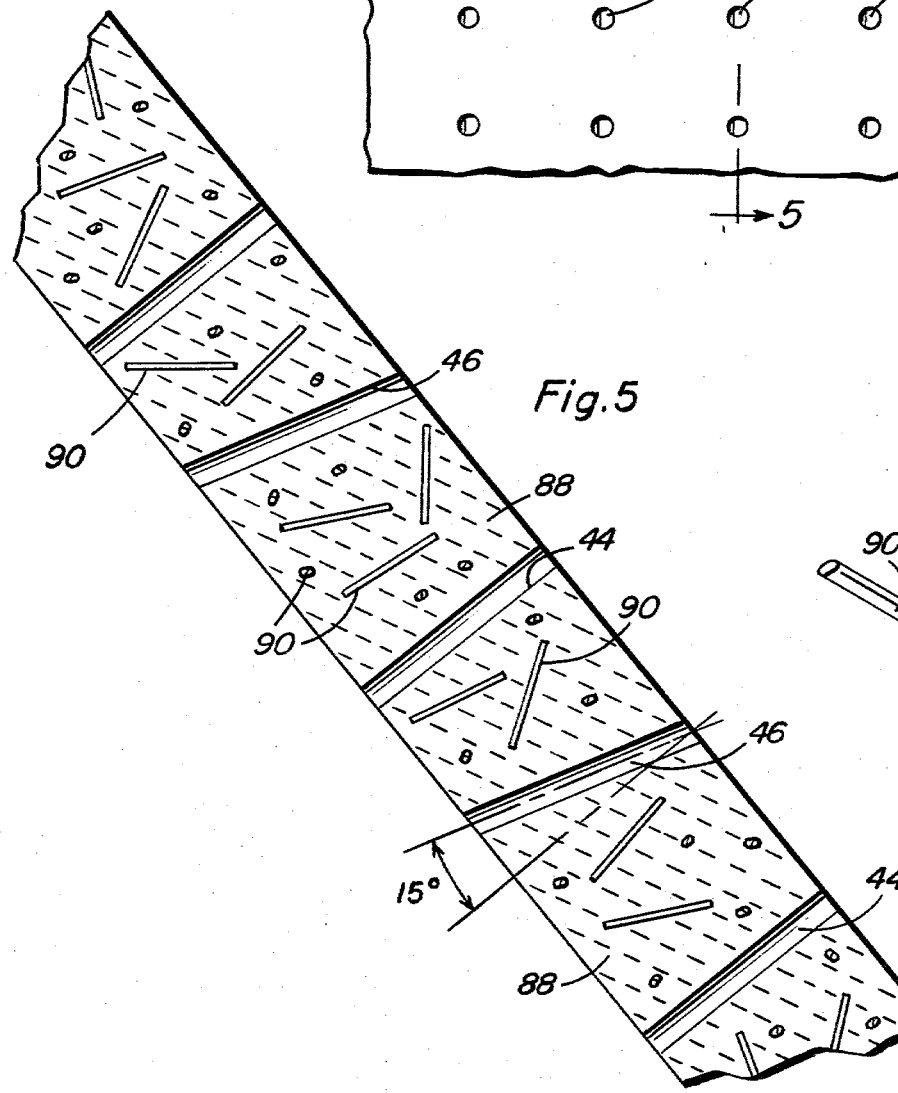
FIG. 5 is an enlarged, fragmentary sectional view of the grate of FIG. 4, taken substantially upon a plane passing along section line 5—5 on FIG. 4.

Support chute 42 is provided with through holes 44 and 46 for passage of air through the grate portion 48 thereof. Through holes 44 are directed perpendicular to the plane of grate 48, as is best seen in FIG. 5, while through holes 46 are directed at an angle of 15 degrees downwardly from the normal, although through holes 46 can be provided at somewhat different angles instead. Through holes 44 are oriented perpendicular to the plane of grate 48 in order to admit air to preheat cellulosic material 26 and 24, and to lift partially decomposed cellulosic material 24 a short distance from the upper surface of grate 48, leaving an air blanket 50 therebetween. Through holes 46 in grate 48 are oriented downwardly at an angle from the perpendicular to the plane of grate 48 and, accordingly, impart a propelling force downwardly along the longitudinal extent of support chute 42. The purpose of the disclosed arrangement of grate 48 with through holes 44 and 46 as described is to provide cooling for grate 48, preheating of incoming air forming in air blanket 50, propulsion of partially decomposed cellulosic material 24 downwardly, lifting of the partly decomposed cellulosic material 24 to reduce wear on the upper surface of grate 48 and thereby prolong the useful life of grate 48, and to provide an accurately controllable flow of air into refractory gas production chamber 20 from blower 56 to support limited decomposition of cellulosic material 26 and 24 in a progressive manner as it moves downwardly in support chute 42.

It is contemplated that an apparatus described will be operated continuously for maximum eceonomic efficiency, with the products of decomposition of cellulosic material 26 in the form of charcoal and ash 52. Continuously operating conveyor 54 removes such non-destroyed material to an area which is separated from the interior of refractory gas production chamber 20, conveyor 54 being constructed to prevent substantial escape of gases from chamber 20 therethrough. It is advantageous to remove non-destroyed material continuously in the manner described, since neither time nor temperature devices for removal of such material has been found satisfactory, since their use affects the production rate of the entire unit in a negative manner, leading to increased damage and maintenance due to a higher temperature in the interior of gas production chamber 20.

Primary air blower 56 provides a controlled flow of air in the direction shown by arrows in duct 58 and in sheet metal wind box 60, which is mounted and sealed parallel to the lower surface of grate 48, and which provides a constant size air inlet means for forcing combustion, preheating of primary air and propelling of primary air through the through holes 44 and 46 of grate 48. The thickness of grate 48 is predetermined to provide close control of the rate of flow of all incoming air. The pressure of air in wind box 60 is controlled to assist in proper destruction of cellulosic material 24 at a predetermined feed rate of incoming cellulosic material 26. Material entering gas production chamber 20 through hopper 28 is distributed more evenly over the entire surface of grate 48 thereby. Inasmuch as the upper section of support chute 42 does not contain design slots or openings, the risk of unwanted gas combustion in incoming cellulosic material 26 is reduced, but conduction of heat from the lower section of grate 48, combined with heating of air resulting from the pressure maintained in wind box 60 maintains grate surface temperature at about 500 degrees F., resulting in preheating of incoming cellulosic material 26. This speeds decomposition of incoming cellulosic material 26 as it passes downwardly toward the conveyor 54 in support chute 42. This is particularly true prior to entry of cellulosic material 26 into the major area of gasification in gas production chamber 20. Through holes 44 and 46 are constructed a size which reduces the production of particulate matter in gas production chamber 20 during decomposition of cellulosic material 26 and 24. Gases produced, including a proportion of carbon monoxide, converge on the throat 62 of outlet duct 64 as indicated by the arrows in gas production chamber 20 as seen on FIG. 1. Combustion gases in duct 64 then enter low velocity air canister 66, which is of conventional construction, for removal of a substantial portion of particulate material, such as smoke or the like. Hot combustion gases issuing from canister 66 then enter duct 68, within which is located refractory nozzle 70 for introduction of secondary air forced therethrough by secondary air blower 72. Further blending and mixing of secondary air with hot combustion gas occurs in combustion chamber 74, part of which is shown in FIG. 1, and the end of which is shown in FIG. 2. Electrode pair 76 is provided with a source of high voltage from high voltage feed line 78 to provide an ignition spark for completing the combustion of gases entering combustion chamber 74 from duct 68. The product formed in combustion chamber 74, which is now in a state of substantially complete combustion, is drawn from combustion chamber 74 by recirculation blower 80 for discharge through exit duct 82. Recirculation blower 80 is provided with a low velocity air box 84 to further remove particulate matter from the gas stream and thereby reduce such matters in the heated gas issuing from exit duct 82. Trapdoor 86 is used to remove accumulated solids as necessary, and valve 88 regulates the size of opening between blower 80 and air box 84. If heated gases so purged of solid particulate matter are introduced into the interior of a lumber drying kiln, problems of undesirable residue deposits on the lumber are avoided.

Grate 48 is shown in FIG. 4 as a perforated plate made of refractory material 88 interlaced with metallic needles 90, grate 48 having through holes 44 at right angles to the plane of grate 48, and through holes 46 angled downwardly at a predetermined angle with respect to a perpendicular. The angle of holes 46 is shown in FIG. 5 as 15 degrees, which has been found to be an angle suitable for serving the purpose of assisting and propelling partially decomposed cellulosic material 24 downwardly through support chute 42. Preferably, refractory material 88 is a kaolin-based clay which has been baked into the sheet making up grate 48. Field experience with existing burner systems fitted with a metal grate of either a bar or slot configuration have a life of very short duration, even when the grate system is made of cast iron or stainless steel. Such systems depend solely on the force of gravity to provide fuel flow, and day-to-day maintenance, as well as time in which such units are out of service, is high.

Grate 48 of the present invention is of hard castable refractory material in which stainless steel needles are interlaced. This construction eliminates a major source of difficulty with prior art arrangements utilizing a grate made entirely of metal, such metal grates being subject to expansion and contraction of the metal grate sections. These problems are minimized when special care is taken in preparation of the grate composition as herein described.

The refractory material used is a kaolin-based material, such as that commonly sold under the trademark "Plicast KL", having a fusion point of about 3205 degrees F. and a service range of about 200–3000 degrees F. This process is exact, and must be adhered to closely if proper results are to be obtained. The procedure for manufacture of grate 48 is given in Example 1 below.

Figure 7:
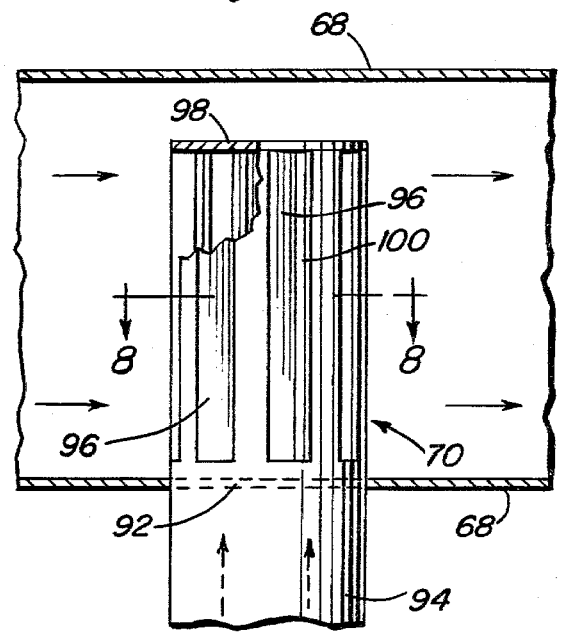
FIG. 7 is a fragmentary sectional view of a refractory nozzle for introducing secondary air into the stream of combustion gas, showing the refractory nozzle partially broken away to disclose inner details thereof.
Figure 8:
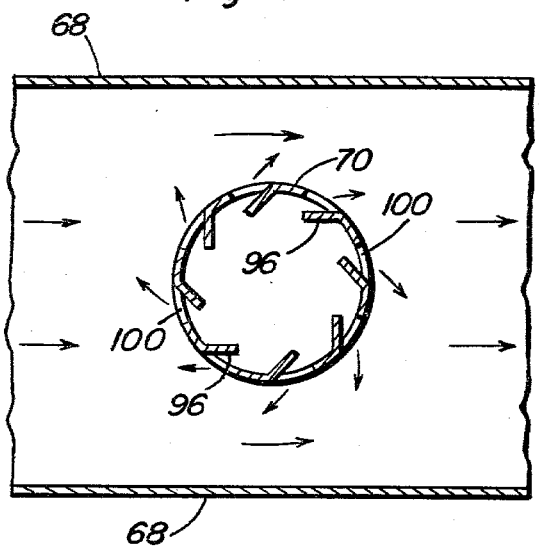
FIG. 8 is a top sectional view of the refractory nozzle of FIG. 7, taken substantially upon a plane passing along section line 8—8 on FIG. 7, showing the circulation pattern of secondary air issuing therefrom.

Refractory nozzle 70 is shown in enlarged from in FIG. 7, where it is located within aperture 92 in duct 68, the nozzle 70 projecting into duct 68 from secondary air inlet pipe 94. Inlet pipe 94 is connected to secondary air blower 72 for transport of air in the direction indicated by the broken arrows in FIG. 7. Flaps 96 are cut into the projecting portion of refractory nozzle 70, and cap 98 in sealing the end of nozzle 70 forces upwardly traveling air to exit nozzle 70 through slits 100 formed by inwardly bent flaps 96. With this arrangement, mixing of secondary air from refractory nozzle 70 with combustion gases passing horizontally along duct 68 is best seen in FIG. 8. The direction of air issuing from nozzle 70 is seen to be in a generally radial direction, but with a tangential component.

Figure 9:
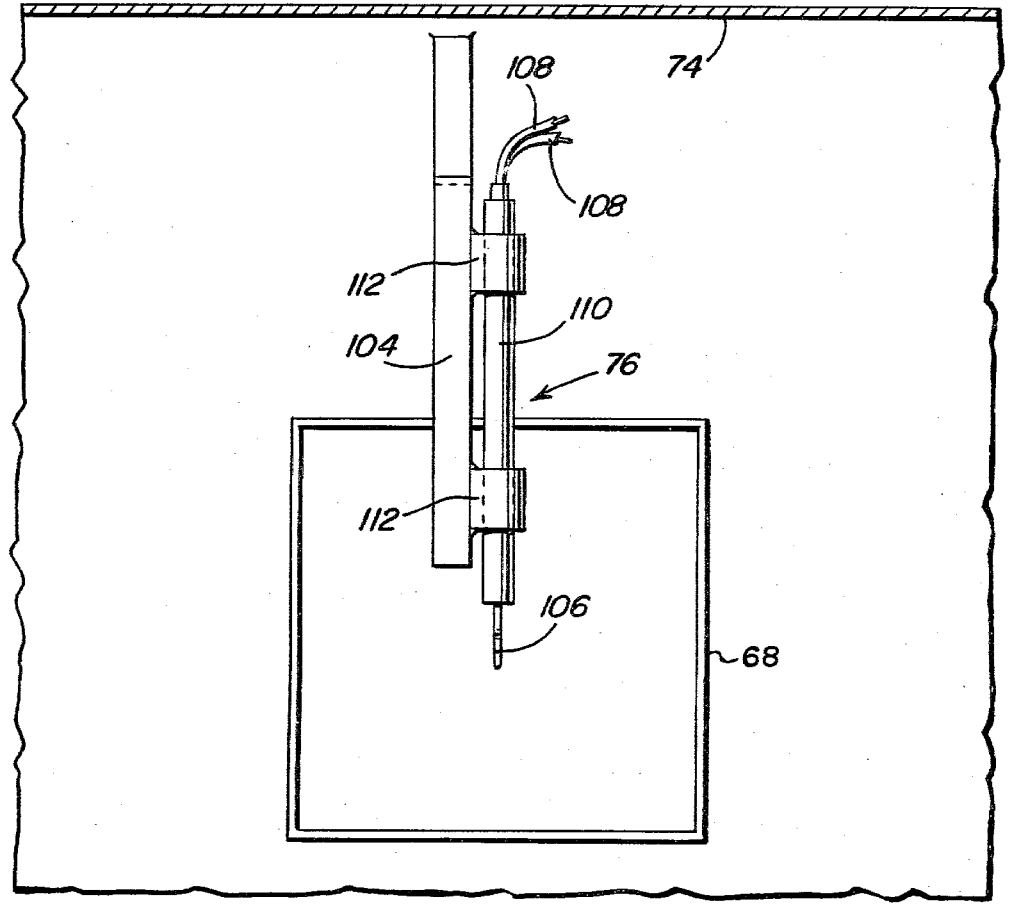
FIG. 9 is a sectional view of the igniting means within the combustion chamber, and is taken substantially upon a plane passing along section line 9—9 on FIG. 1.

FIG. 9 shows spark igniter 76 held in place within combustion chamber 74 by support bar 104. A mixture of combustion gas and secondary air enters combustion chamber 74 through duct 68, and a pair of electrode tips 106 supports a spark resulting from application of high voltage carried by wire 108 through insulated support rods 110. Collars 112 adjustably positioned support rods 110 with respect to bar 104. High voltage can be applied to tips 106 as needed to insure complete combustion of the gas mixture within combustion chamber 74. Alternatively, gaseous material introduced from duct 68 into chamber 74 can carry small tracers, which ignite the gaseous material as it is introduced to the secondary airstream. Preferably, however, a continuous spark or natural gas pilot is used, in order to reduce the possibility of danger from unignited gases in combustion chamber 74. Example 2 presents results of a commercial test on a system of the present invention.

Combustion chamber 74 is preferably constructed of refractory board and is preferably rectangular in shape. Recirculation blower 80 produces draft to remove the gaseous products of combustion from combustion chamber 74, and the heated combustion products are then conveyed to the point of use, which is contemplated as the interior atmosphere of a lumber drying kiln. With the present invention, the support chute and grate is not adversely affected by heat generated by combustion in chamber 20 or by the chemical effects of gasification. The present invention avoids the necessity of time, temperature or electrical limiting devices or limited switches to control the introduction of fibrous material and withdrawal of ash and charcoal products. Continuous operation, besides representing a more efficient use of invested capital, also tends to reduce damage and maintenance as well. With use of the support chute and grate of the present invention, necessity for mechanical devices to vibrate or dislodge cellulosic material in order to produce even fuel flow is avoided. In fact, no moving parts are required for forcing the flow of fuel. The continuous nature of the non-destroyed discharge, independent of time or temperature limiters, provides for equal removal of non-destroyed material throughout the full width of the removal system. With use of the particulate matter removal systems disclosed in the present invention, a problem commonly found with prior art systems is avoided, namely the deposition of residue or particulate matter on lumber dried in kilns furnished with the combustion gases of prior art devices. In addition, health and environmental hazards are successfully minimized with the present invention insofar as air pollution conventionally results from particulate matter removed in the canister, air box, and combustion chamber of the present invention.

EXAMPLE 1

Figure 6:
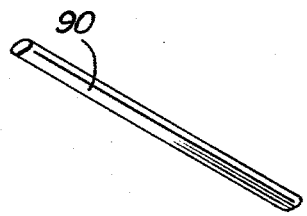
FIG. 6 is a greatly enlarged perspective view of a stainless steel needle interlaced within the support chute material shown in FIG. 5.

100 pounds of the trademarked material "Plicast KL" mix is added to precisely 5 quarts (10.4 pounds) of water in a cement mixer. While the the mixing proceeds 1½ pounds of stainless steel needles are gradually added to the mixture, the needles having the approximate dimensions 0.010 inches by ×0.022 inches×1 inch, as illustrated in FIG. 6. The resulting material is mixed thoroughly in the cement mixer for 5 minutes, and then poured into prepared molds while vibrating for proper consistency. The mold is allowed to stand at room temperature for 15 hours. The cast section is then drilled to provide rows of ¼ inch holes on 2 inch centers with alternate rows of these holes at a 15 degree diagonal. The sections are then cured in an oven at a temperature of 100 degrees F. The temperature of the oven is increased 50 degrees F. per hour until the oven temperature reaches 1000 degrees F., at which level it is maintained for 8 hours. The temperature is then increased 100 degrees F. per hour until the oven reaches 2000 degrees F. The oven temperature is then decreased gradually until the sections are cooled to an ambient temperature.

EXAMPLE 2

A commercial test was performed on a system shown in FIGS. 1 and 2 having a capacity of 10,500,000 BTU's, where grate 48 had a surface area of 35 square feet. The incoming cellulosic material 26 was southern pine planer shavings having a moisture content of about 15%. The unit produced gas for a forced air heater, firing directly into the drying chamber of a high temperature lumber drying kiln held at about 240 degrees F.

Tests were run in 5- to 24-hour continuous cycles, starting with 68,000 pounds of material in a storage bin. The heat required to dry the lumber for each 24-hour charge was 101,500,000 BTU's, or 507,500,000 BTU's for the 5 days of testing. At peak loading, the unit generated gas having a heat value of 10,480,000 BTU's from 1310 pounds of planar shavings per hour. To assure accuracy, the unit was attached to an existing propane fired furnace, with propane burner disconnected, and identical results were achieving using either propane or using the apparatus of the present invention.

The test results show a production rate of 300,000 BTU's per square foot of grate surface area, at full firing temperature, with a turndown rate of 4½ to 1.

Throughout the specification and claims, parts and proportions have been given in weight percent unless otherwise specified, and temperatures are given in degrees F. unless otherwise specified.

It should be particularly pointed out that with use of grate 48 of the present invention, gas combustion chamber 20 is enabled to run at a temperature of approximately 600 degrees lower than most alternative devices for burning of cellulosic materials such as wood chips. The interior of gas production chamber 20 never reaches a temperature greater than 1200 degrees F., thereby avoiding slagging which occurs typically at temperatures of 1500 degrees F. or above.

Moreover, the structure of the gas production chamber avoids all horizontal shelf areas where material could collect and eliminate or hinder free flow thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for producing combustible gases from cellulosic material and burning said gases to products of combustion, the apparatus comprising:
    (a) a refractory gas production chamber for partial combustion of said cellulosic material to produce said combustible gases, comprising:
        1. feed means for introducing the cellulosic material;
        2. support means for supporting the cellulosic material; and
        3. forced primary air means for controllably introducing primary air into the gas production chamber;
    (b) duct means for withdrawing the gases from the gas production chamber;
    (c) secondary air introduction means for blending secondary air into said duct means;
    (d) a combustion chamber for receiving from the duct means and burning a blend of said combustion gases and secondary air to hot gaseous products of substantially complete combustion; and
    (e) recirculation blower means for withdrawing said hot gaseous products from the combustion chamber for further use;
    said support means being adapted to permit continuous operation of the apparatus, the support means comprising an inclined support chute extending at an angle from the top to the bottom of said gas production chamber, the chute having a bottom surface in the form of a flat grate perforated for controllable passage therethrough of said primary air from the forced primary air means, the apparatus further including:
    (f) removal means positioned at the lower exit of said chute material for continuous withdrawal of non-destroyed cellulosic material propelled thereinto by said primary air; and
    (g) igniting means for maintaining partial combustion in said gas production chamber;
    said perforated grate having a plurality of perpendicular through holes and a plurality of non-perpendicular through holes for directing said primary air toward said cellulosic material in said chute to form an air blanket between the cellulosic material and the grate and to propel the cellulosic material longitudinally down the chute, said grate being made from a refractory composition interlaced with metallic needles.

2. The apparatus of claim 1 wherein said non-perpendicular through holes are inclined about 15 degrees downwardly from a perpendicular to the surface of said grate.

3. The apparatus of claim 2 wherein said refractory composition is a cured kaolin-type clay, and said metallic needles are stainless steel needles.

4. The apparatus of claim 2 wherein said forced primary air means comprises a wind box attached dependingly below said grate for furnishing of primary air thereto and a primary air blower connected to the wind box for controllably supplying primary air thereto, said duct means comprises a longitudinal duct having successively along its length a low velocity air canister and said secondary air introduction means, the secondary air introduction means comprising a refractory nozzle projecting into the duct and a secondary air blower connected to the nozzle for regulatably delivering secondary air thereto, said combustion chamber comprises a refractory rectangular box on which is mounted said recirculation blower means, the recirculation blower means comprising a recirculation blower and a low velocity air box, the combustion chamber further including ignition means for maintaining combustion of said blend.

5. An inclined grate for support and movement of a combustible solid during continuously conducted combustion thereof comprising a substantially planar sheet having a plurality of through holes for preheating of air passing upwardly therethrough, for furnishing said air for combustion of said solid, and for lifting said solid and moving the solid downwardly along the inclined grate during progressive combustion thereof, said through holes include perpendicular through holes and non-perpendicular through holes to form an air blanket between the combustible solid and the grate and for propelling the solid downwardly along the inclined grate, said grate being made from a refractory composition interlaced with metallic needles.

6. The inclined grate of claim 5 wherein said refractory composition is a cured kaolin-type clay and said metallic needles are stainless steel needles.

7. The apparatus of claim 6 wherein said non-perpendicular through holes are inclined about 15 degrees downwardly from a perpendicular to the surface of the grate.

8. The inclined grate of claim 5 further comprising a wind box attached dependingly below said grate for furnishing said air thereto.

9. A refractory gas production chamber for partial combustion of cellulosic material to produce combustible gases, comprising; feed means for introducing the cellulosic material, support means for supporting the cellulosic material, forced primary air means for controllably introducing primary air into the gas production chamber, and duct means for withdrawing the gases from the gas production chamber, said support means comprising an inclined support chute extending at an angle from the top to the bottom of said gas production chamber, the chute having a bottom surface in the form of a flat grate perforated for controllable passage therethrough of said primary air from the forced primary air means, the gas production chamber further including at the lower exit of said chute removal means for continuous withdrawal of non-destroyed cellulosic material propelled thereinto by said primary air, and igniting means for maintaining partial combustion in the said gas production chamber, said perforated grate being made from a refractory composition interlaced with metallic needles.

10. The refractory gas production chamber of claim 9 wherein said forced primary air means comprises a wind box attached dependingly below said grate for furnishing of primary air to the grate and a primary air blower connected to the wind box for controllably supplying primary air thereto.

11. The refractory gas production chamber of claim 10 wherein said perforated grate has a plurality of perpendicular through holes and a plurality of non-perpendicular through holes for directing said primary air toward said cellulosic material in said chute to form an air blanket between the cellulosic material and the grate and to propel the cellulosic material longitudinally down the chute.

12. The refractory gas production chamber of claim 11 wherein said non-perpendicular through holes are inclined about 15° downwardly from a perpendicular to the surface of said grate.

13. The refractory gas production chamber of claim 12 wherein said refractory composition is a cured kaolin-type clay, and said metallic needles are stainless steel needles.

* * * * *